United States Patent [19]

Floyd

[11] 4,426,859
[45] Jan. 24, 1984

[54] ANTI-THEFT AUTO LOCK

[76] Inventor: Herbert R. Floyd, 420 E. 105 St. #2-H, New York, N.Y. 10029

[21] Appl. No.: 284,974

[22] Filed: Jul. 20, 1981

[51] Int. Cl.³ .................... B60R 25/00; E05B 11/00; E05B 17/14; E05B 65/12
[52] U.S. Cl. ........................................ 70/18; 70/232; 70/427; 70/428; 70/430
[58] Field of Search .................. 70/14, 18, 232, 237, 70/423–430

[56] References Cited

U.S. PATENT DOCUMENTS

| | | | |
|---|---|---|---|
| 1,206,611 | 11/1916 | Strode | 70/427 |
| 2,883,849 | 4/1959 | Lorenzo | 70/427 |
| 3,665,738 | 5/1972 | Pescuma et al. | 70/427 X |
| 3,948,069 | 4/1976 | Imbriano | 70/428 |
| 4,098,102 | 7/1978 | Kalina | 70/428 X |
| 4,104,895 | 8/1978 | Tankel | 70/428 X |
| 4,134,279 | 1/1979 | Ross et al. | 70/428 X |
| 4,227,388 | 10/1980 | Nigrelli et al. | 70/427 |

*Primary Examiner*—Cornelius J. Husar
*Assistant Examiner*—Carl F. Pietruszka

[57] ABSTRACT

Disclosed is an auto anti-theft ignition switch lock for preventing unauthorized access to the ignition switch which is mounted on the steering column of most conventional automobiles. The ignition switch lock includes a housing, one end of which is shaped to conform to the contours of a steering column, having a latched enclosure member which is shaped to adapt to the column for securement of the device to the steering column. The device further includes a housing and a movable access door therein which is shaped to conform to the contours of a pair of long narrow uniform furrows which is manifested beneath the surface of a pair of interior walls within the housing, stops, guide surfaces and a key operated latch for selectively controlling the movement of the door, which moves along in constant frictional contact with the smooth surface of the pair of hollowed out furrows. Unlocked, the door drops in a downward motion and will thereafter be returned in an upward motion against gravity to be moved into engagement with and locked to a conventional key operated spring lock, mounted within the housing, and thus exibiting a locked position that closes the opening to which it is fitted.

3 Claims, 6 Drawing Figures

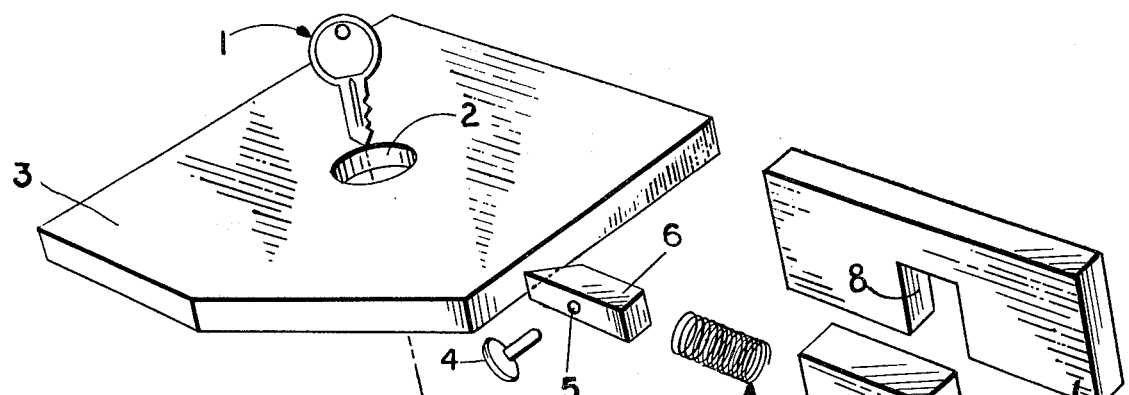
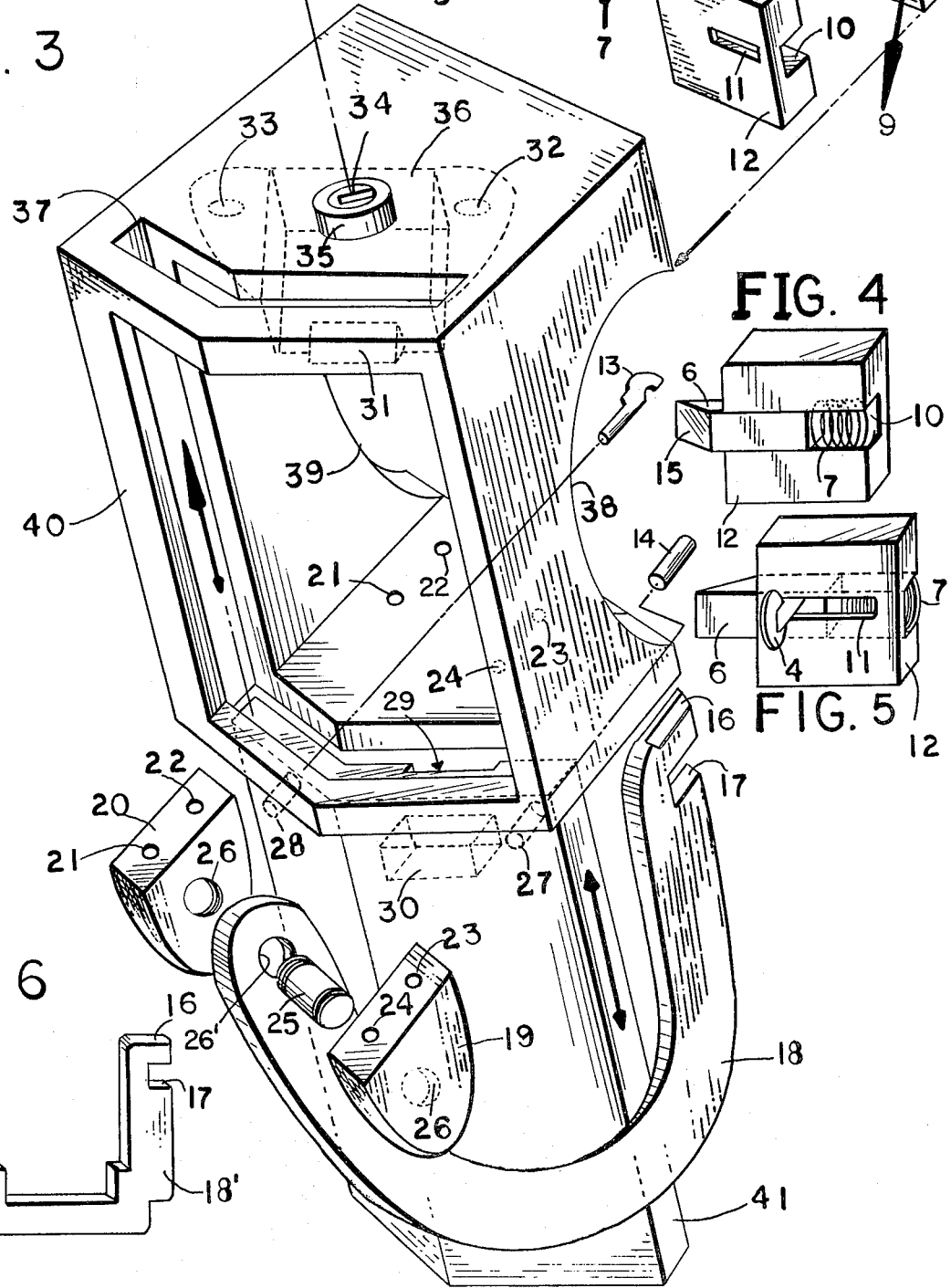

ANTI-THEFT AUTO LOCK

This invention relates to automobiles, and specifically to an improved ignition switch lock which is mounted on the steering column of most domestic automobiles to control access to the ignition switch lock.

In recent years most automobile manufacturers have begun to include a steering column mounted automobile ignition switch lock which is linked to a locking mechanism for the automobile's transmission and for the steering column to prevent theft and or otherwise unauthorized movement of the vehicle when the ignition is in the off or locked position. The very nature of the lock structure permits easy dislodgement of the mechanisms so that the removal thereof by forcing a screw into the keyhole of the ignition switch is feasible.

Heretofore, automobile ignition switch lock mechanisms had conventional padlocks, and consequently were easily removable by means of a cutting device such as a lock cutter. An example of such prior art auxiliary devices may be found in U.S. Pat. No. 3,811,303 and U.S. Pat. No. 3,665,738. Both of these devices completely encircles the steering column in the vicinity of the ignition switch.

It is therefore the principal object of this invention to provide an improved steering wheel lock mechanism which is relatively simple in design, highly resistive to picking and yet inexpensive and easy to apply to the steering column and may only be removed by an autorized user of the automobile. Moreover, this invention is completely interchangeable from automobile to automobile. Another object of this invention is to provide an ignition switch lock which is highly resistive to damage or destruction, when placed over the ignition switch of an automobile, and locked in place by use of a spring lock.

A still further object of my invention is to provide an ignition switch lock which will allow the owner or other authorized operator of an automobile the ability to turn on the ignition switch without necessitating removal of the device from the steering column.

Briefly, in accordance with the principles of this invention, an auto anti-theft lock which is shaped to conform to the contours of the conventional steering column is provided with latched means for securement of the device thereto. The device further includes another latched movable structure for opening or closing an access entrance which is operated by a conventional key operated spring lock, mounted within the housing.

It is therefore a feature of an embodiment of this invention that an ignition switch lock is provided with a movable door which is sent on a journey upward manually against gravity in constant frictional contact with the smooth bearing surface of a pair of hollowed out furrows which is manifested beneath the surface of a pair of interior walls within the housing, serving as a slide with means for engaging the conventional key operated spring lock mounted therein. The engaging means preferably includes a latch having a spring attached thereto. Moreover, the design facilitates exertion of increasing power from an authorized hand moving the door upward in contact with and pressuring the latch in opposition to the attached spring, and having the spring send the latch on a short course of travel in a brief space of time, consequently inserting the latch into an aperture in the interior portion of the door when it reaches its capacity thereto. A simple movement, despite underlying complexity of the activities specified, having the index-finger of the authorized hand placed underneath the door with the palm portion of the hand facing up and pushing the door upward therewith in a thrusting motion with means for engaging with and locked to the spring lock, is a fact.

Further objects and advantages of my invention will become apparent from a consideration of the drawings and ensuing description thereof.

FIG. 3 shows an exploded view of the assembly;

FIG. 4 shows a rear view of the enclosure latch mechanism, which is provided for securement of the device to the steering column;

FIG. 5 shows a front view of the same latch mechanism, which is provided with means for securement of the device to the steering column; and FIG. 6 shows a second possible shape for the enclosure member which is provided with means for engaging with and locked to the spring latch mechanism shown in FIGS. 4 and 5.

Figure 1:
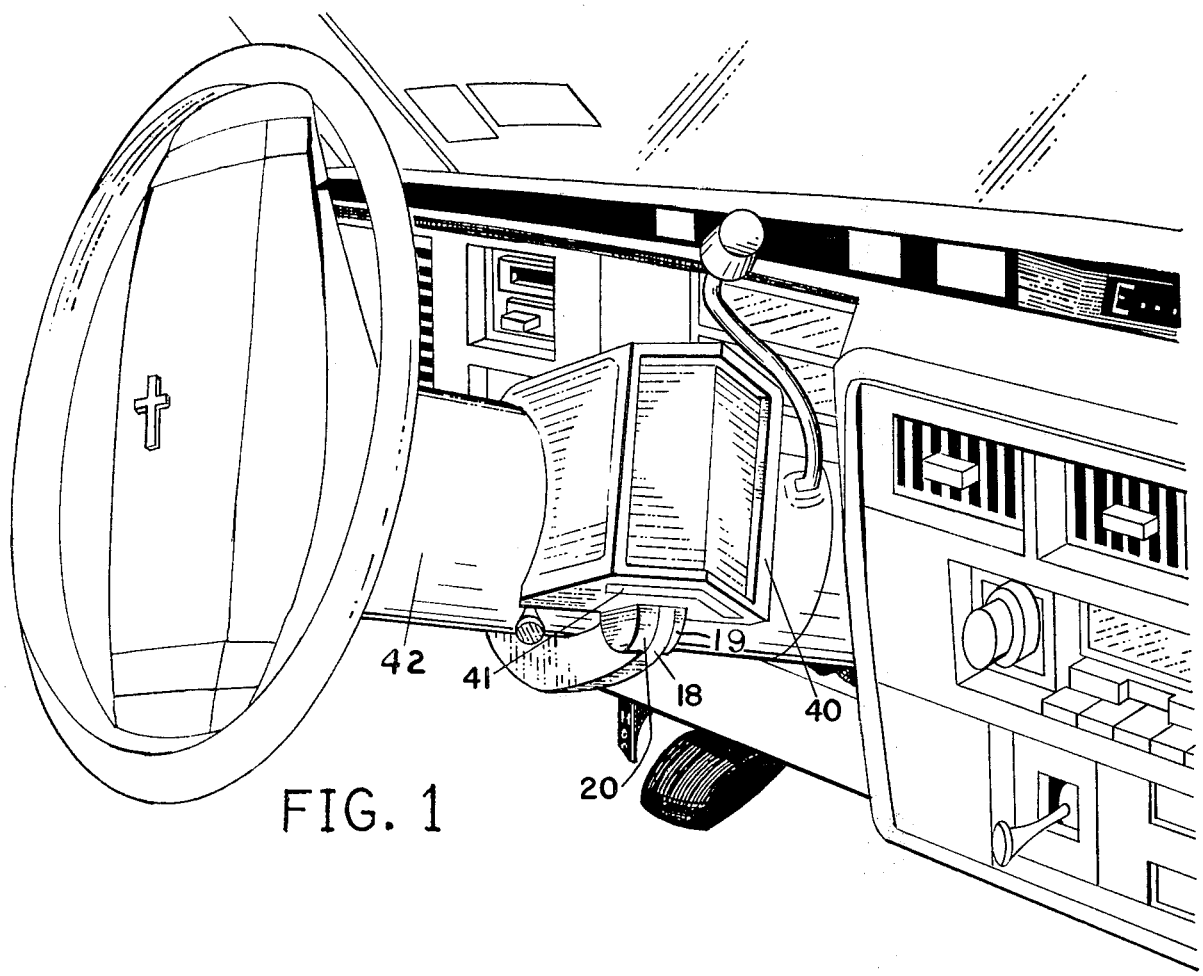
FIG. 1 is a perspective view of an ignition switch lock constructed according to a preferred embodiment of this invention, shown attached to a conventional automobile steering column with the auto ignition switch lock mechanism engaged according to the invention herein.
Figure 2:
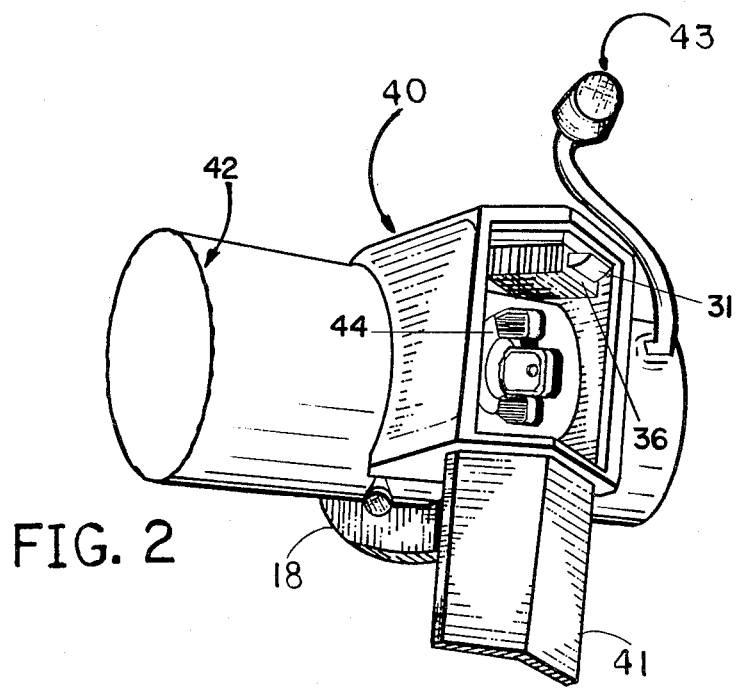
FIG. 2 shows a typical steering column mechanism with the auto ignition switch lock mechanism disengaged.

Now describing the invention in particular and describing the various individual parts by reference numbers, and wherever possible identifying like parts with like reference numbers, FIG. 1 shows a steering wheel and column 42 having the usual ignition switch lock 44 disposed to locking the functioning of the steering column 42 to cause complete immobility of the steering capability of the automobile. The instant auto ignition switch lock 40 comprises a movable door 41 shown in an unlocked position in FIG. 2. Referring now, in addition, to FIGS. 1 and 2, ignition switch lock 40 has an outer casing 40 which is substantially boxy shaped having the relative position of ten points composing its external surface shown in FIG. 3, but which conforms on its inner ends 38 and 39 to the contours of the outer surface of steering column 42. As shown best in FIGS. 1, 2 and 3.

The ten cornered boxy shaped casing 40 comprises a sliding door 41, shown in a locked and unlocked position in FIGS. 1 and 2, which will allow the owner of the vehicle to insert his hand through the aperture of the door way of casing 40, and turn on the ignition switch 44 with avoidance of removal of the device 40 therefrom. The casing 40 comprises a rear enclosure at 12, as shown in FIGS. 3, 4 and 5, composed of essentially four metal elements, 4 serving as a handle shown in FIG. 5, and 6 is a latch having an aperture 5, with element 7 serving as a spring in opposition to the bar shaped member 6, shown in FIGS. 4 and 5, resting on surface 10.

The element 12 serves as a casing comprising an aperture 11 within the front external surface thereof, and having the said handle 4 inserted through the said aperture 11 into engagement with the aperture 5, and secured to the bar shaped element 6, shown in FIG. 5.

The auto lock 40 is further provided with means for selective activation of the disengaging means, by releasing the sliding door 41 when key 1 is rotated, consequently pressuring the latch 31 in opposition to the attached spring, mounted within the spring lock 36, however, sending the metal door 41 downward on a short course of travel in a brief space of time under gravity, and coming to a halt when stopped by a pair of bar shaped elements 13 and 14 as are positioned at a relatively short distance in space from the top of the door 41, and means for engaging with a pair of apertures 27 and 28 for securement of the said pair 13 and 14 to the sliding door 41, having the protruding ends of 13 and 14 come to rest on the inside bottom surface of the housing 40, serving as an obstacle to prevent the door 41 from falling through the aperture 37 positioned at the bottom of the housing.

The door 41 is further provided with a cutout 29 designed to conform to the contours of latch 31 for a smooth engaging function.

The spring lock 36 comprises a pair of apertures 32 and 33 on each side therein for securement of said lock within the housing 40. Aperture 2 is designed to conform to the mold of the external protruding portion 35 of the spring lock 36, shown in FIG. 3.

Referring now to FIG. 3, element 18 comprises an obliqued angle of 45 degrees on the surface 16, and means for a smooth engagement with obliqued angle latch face 15. The surface 16 may be moved into engagement with surface 15, however, pressuring latch 6 in opposition to spring 7, and having the spring 7 send the latch 6 on a short course of travel in a brief space of time, consequently inserting the latch 6 into an aperture 17, which is positioned at a relatively short distance in space beneath the obliqued surface 16, for securement of the device 40 to the steering column 42.

Element 18 comprises an aperture 26, having a pin shaped member 25 comprising threads at each end for securement of said 25 to a pair of members, 19 and 20, each of which comprises an aperture 26, having threads therein for engaging with and fastening thereto, preferably by moving 25 through aperture 26' positioned in the said end of 18, and 25 may be screwed into one aperture 26, positioned in the vicinity of the center of unit 20, and having 19 screwed onto the other said end of 25, and having aperture 26 fastened thereto. Disengaging means of the spring latch mechanism 12 will become apparent when handle 4 is moved in opposition to spring 7, consequently withdrawing latch 6 in retreat from aperture 17, and releasing 18 from latch 6, this may be accomplished by the owner inserting his hand through the door way of housing 40, and with any finger of the right hand pushing the handle 4 in the direction of the spring 7, for removal of the device 40 therefrom.

Moreover, having the sliding door both open and close with avoidance of removal of the ignition key from the ignition switch is a fact.

Most automobile manufacturers have recently begun to incorporate semi boxy shaped steering columns into the vehicles which they produce.

The boxy shaped portion of the steering column is positioned on the outer lefthand side of the steering column, with the ignition switch 44 positioned at the round portion of the steering column, on the right-hand side.

Due to the complexity of the activities specified, the element 18' shown in FIG. 6 is shaped to conform to the contours of the semi boxy shaped steering column, which may be moved into engagement with and locked around the boxy shaped steering column thereto.

The gear shift 43 may be shifted for connecting and disconnecting any of a number of sets of transmission gears to the automobile's motor, with avoidance of removal of the device 40 from the steering column 42. Moreover, the sliding door 41 may be controlled by means of a battery operated miniature size electrical motor, however, installation of such devices specified may result in additional cost to the owner of the anti-theft auto lock 40.

Having described the invention with certain particularities and likewise being aware that the invention comprises additional embodiments not particularly shown or described herein, however, various changes in and other modifications of the construction, composition, and arrangement of parts is feasible in light of the above science and teachings. FIG. 3 shows an exploded view of the security device with the various parts and how they integrate into a complete assembly as shown by the other drawings in the case to form an anti-theft auto ignition lock security device.

Having described the invention what is claimed is:

1. An anti-theft auto lock for providing authorized access to an auto ignition switch mounted on the steering column of a vehicle with avoidance of removal of said anti-theft lock from said steering column; said steering column being substantially cylindrical in shape and having a first axis, and said ignition switch having a still segment fixed to said steering column and a movable segment rotatable with respect to said stationary segment about a second axis substantially perpendicular to said first axis and spaced from said stationary segment to define an annular hiatus therebetween; said auto lock comprising (a) a boxy shaped housing having one end surface shaped to join with and conform to the side of the circumference of said steering column completely encasing the side of said steering column in the vicinity of said ignition switch, (b) means in said housing for engaging an enclosure, composed of a latch comprising an aperture having a handle secured therein for moving said latch in opposition to a spring for disengaging one end of an arcuate enclosure member having the other end thereof secured to the exterior bottom surface of said housing pivotally connected thereto, and (c) means for controlling said pivotally connected arcuate member having an obliqued surface for said engaging with an obliqued surface of said latch, whereby latching may be accomplished manually, however, (i) the said housing comprises an access opening and a closure for such access opening comprising a sliding door which moves up and down within at least one furrow manifested beneath the surface of at least one interior wall within said housing, serving as a bearing, and (ii) means for guiding said door into engagement with a conventional key operated spring lock defining a second latch mounted within said housing, whose latching is accomplished by having the index finger of said authorized hand placed underneath said door with the palm portion of said hand facing up, and subsequently pushing said door upward in a thrusting motion consequently pressuring said second latch in said opposition to said spring, and said spring sending said second latch on a short course of travel in a brief space of time into an aperture in the interior portion of said door positioned near the top thereof, consequently locking said door of said housing with avoidance of removal of the ignition key from said ignition switch.

2. An anti-theft auto lock in accordance with claim 1 wherein said means for guiding said movable door of said housing comprises two furrows within two interior walls.

3. An anti-theft auto lock in accordance with claim 2 wherein means for shifting the gear-shift is normally operable with said anti-theft auto lock installed on said steering column.

* * * * *